United States Patent
Li et al.

(10) Patent No.: US 10,666,785 B2
(45) Date of Patent: May 26, 2020

(54) BLUETOOTH COMMUNICATION METHOD AND DEVICE

(71) Applicant: Huawei Technologies Co., Ltd., Shenzhen (CN)

(72) Inventors: Yan Li, Shenzhen (CN); Yusheng Liao, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 180 days.

(21) Appl. No.: 15/329,003

(22) PCT Filed: Jul. 28, 2014

(86) PCT No.: PCT/CN2014/083172
§ 371 (c)(1),
(2) Date: Jan. 25, 2017

(87) PCT Pub. No.: WO2016/015209
PCT Pub. Date: Feb. 4, 2016

(65) Prior Publication Data
US 2017/0223163 A1    Aug. 3, 2017

(51) Int. Cl.
*H04M 1/725* (2006.01)
*H04B 5/00* (2006.01)
(Continued)

(52) U.S. Cl.
CPC ........ *H04M 1/7253* (2013.01); *G06F 1/3215* (2013.01); *H04B 5/0031* (2013.01);
(Continued)

(58) Field of Classification Search
CPC .. H04M 1/7253; H04M 3/537; H04M 1/6066; H04W 4/80; H04W 4/008; H04W 84/18
See application file for complete search history.

(56) References Cited

U.S. PATENT DOCUMENTS

2002/0068600 A1* 6/2002 Chihara ................. H04B 1/385
455/557
2002/0068610 A1* 6/2002 Anvekar ............. H04M 1/6066
455/560
(Continued)

FOREIGN PATENT DOCUMENTS

CN        1510934 A     7/2004
CN     101119424 A     2/2008
(Continued)

OTHER PUBLICATIONS

Machine Translation and Abstract of Chinese Publication No. CN101334689, Dec. 31, 2008, 18 pages.
(Continued)

*Primary Examiner* — Lester G Kincaid
*Assistant Examiner* — Maryam Soltanzadeh
(74) *Attorney, Agent, or Firm* — Conley Rose, P.C.

(57) ABSTRACT

Methods and apparatuses for communications between a wearable device, a headset that can be attached to and detached from the wearable device, and a communications device. The wearable device detects when a user detaches the headset and establishes a Bluetooth connection between the headset and the wearable device or between the headset and another communications device.

18 Claims, 6 Drawing Sheets

---

A wearable device detects whether a Bluetooth headset is detached from the wearable device — S101

If the wearable device detects that the Bluetooth headset is detached from the wearable device, the wearable device sends a first notification to a communications device, where the first notification is used to instruct the communications device to transmit a voice message to the Bluetooth headset by means of Bluetooth — S102

(51) Int. Cl.

| | | |
|---|---|---|
| G06F 1/3215 | (2019.01) | |
| H04W 52/02 | (2009.01) | |
| H04M 1/02 | (2006.01) | |
| H04W 4/80 | (2018.01) | |
| H04M 1/60 | (2006.01) | |
| H04M 3/537 | (2006.01) | |
| G06F 1/16 | (2006.01) | |
| H04W 84/18 | (2009.01) | |

(52) U.S. Cl.
CPC ....... *H04M 1/0258* (2013.01); *H04M 1/6066* (2013.01); *H04M 3/537* (2013.01); *H04W 4/80* (2018.02); *H04W 52/0229* (2013.01); *H04W 52/0254* (2013.01); *H04W 52/0274* (2013.01); *G06F 1/163* (2013.01); *H04M 2250/02* (2013.01); *H04W 84/18* (2013.01); *Y02D 70/00* (2018.01); *Y02D 70/144* (2018.01); *Y02D 70/166* (2018.01); *Y02D 70/26* (2018.01); *Y02D 70/42* (2018.01)

(56) References Cited

U.S. PATENT DOCUMENTS

| | | | |
|---|---|---|---|
| 2007/0105499 A1 | 5/2007 | Ko et al. | |
| 2009/0215393 A1* | 8/2009 | Smyers | H04W 76/14 455/41.2 |
| 2010/0203831 A1 | 8/2010 | Muth | |
| 2010/0279608 A1 | 11/2010 | Shi-En | |
| 2011/0117840 A1 | 5/2011 | Li | |
| 2011/0244927 A1 | 10/2011 | Kari et al. | |
| 2012/0028581 A1* | 2/2012 | Lee | H04M 1/0258 455/41.2 |
| 2012/0242294 A1 | 9/2012 | Muth | |
| 2014/0045463 A1* | 2/2014 | Hsieh | G06F 1/1643 455/411 |
| 2014/0233752 A1 | 8/2014 | Seo et al. | |

FOREIGN PATENT DOCUMENTS

| | | |
|---|---|---|
| CN | 101309093 A | 11/2008 |
| CN | 101334689 A | 12/2008 |
| CN | 101640552 A | 2/2010 |
| CN | 201515412 U | 6/2010 |
| CN | 201639740 U | 11/2010 |
| CN | 102325312 A | 1/2012 |
| CN | 102348020 A | 2/2012 |
| CN | 202178792 U | 3/2012 |
| CN | 102647645 A | 8/2012 |
| CN | 102647646 A | 8/2012 |
| CN | 103076735 A | 5/2013 |
| CN | 202957819 U | 5/2013 |
| CN | 103167365 A | 6/2013 |
| CN | 103200483 A | 7/2013 |
| CN | 103200484 A | 7/2013 |
| CN | 103220401 A | 7/2013 |
| CN | 103237142 A | 8/2013 |
| CN | 203120129 U | 8/2013 |
| CN | 203136125 U | 8/2013 |
| CN | 203136126 U | 8/2013 |
| CN | 203327002 U | 12/2013 |
| CN | 103746727 A | 4/2014 |
| CN | 203596842 U | 5/2014 |
| JP | 2006050058 A | 2/2006 |
| KR | 101110424 B1 | 2/2012 |
| KR | 20140064590 A | 5/2014 |

OTHER PUBLICATIONS

Machine Translation and Abstract of Chinese Publication No. CN102348020, Feb. 8, 2012, 15 pages.
Machine Translation and Abstract of Chinese Publication No. CN102647645, Aug. 22, 2012, 18 pages.
Machine Translation and Abstract of Chinese Publication No. CN102647646, Aug. 22, 2012, 16 pages.
Machine Translation and Abstract of Chinese Publication No. CN103076735, May 1, 2013, 6 pages.
Machine Translation and Abstract of Chinese Publication No. CN103237142, Aug. 7, 2013, 9 pages.
Machine Translation and Abstract of Chinese Publication No. CN202178792, Mar. 28, 2012, 6 pages.
Machine Translation and Abstract of Chinese Publication No. CN202957819, May 29, 2013, 13 pages.
Machine Translation and Abstract of Chinese Publication No. CN203120129, Aug. 7, 2013, 7 pages.
Machine Translation and Abstract of Chinese Publication No. CN203327002, Dec. 4, 2013, 11 pages.
Foreign Communication From A Counterpart Application, Chinese Application No. 201480036330.4, Chinese Office Action dated Sep. 13, 2017, 5 pages.
Machine Translation and Abstract of Chinese Publication No. CN203596842, May 14, 2014, 8 pages.
Machine Translation and Abstract of Chinese Publication No. CN1510934, Jul. 7, 2004, 8 pages.
Machine Translation and Abstract of Chinese Publication No. CN101119424, Feb. 6, 2008, 4 pages.
Machine Translation and Abstract of Chinese Publication No. CN102325312, Jan. 18, 2012, 6 pages.
Machine Translation and Abstract of Chinese Publication No. CN103167365, Jun. 19, 2013, 5 pages.
Machine Translation and Abstract of Chinese Publication No. CN103200483, Jul. 10, 2013, 13 pages.
Machine Translation and Abstract of Chinese Publication No. CN103200484, Jul. 10, 2013, 13 pages.
Machine Translation and Abstract of Chinese Publication No. CN103220401, Jul. 24, 2013, 10 pages.
Machine Translation and Abstract of Chinese Publication No. CN103746727, Apr. 23, 2014, 8 pages.
Machine Translation and Abstract of Chinese Publication No. CN201515412, Jun. 23, 2010, 11 pages.
Machine Translation and Abstract of Chinese Publication No. CN201639740, Nov. 17, 2010, 7 pages.
Machine Translation and Abstract of Chinese Publication No. CN203136125, Aug. 14, 2013, 13 pages.
Machine Translation and Abstract of Chinese Publication No. CN203136126, Aug. 14, 2013, 13 pages.
Machine Translation and Abstract of Korean Publication No. KR101110424, Feb. 24, 2012, 6 pages.
Foreign Communication From A Counterpart Application, Chinese Application No. 201480036330.4, Chinese Office Action dated Jan. 4, 2017, 6 pages.
Foreign Communication From A Counterpart Application, European Application No. 14898985.8, Extended European Search Report dated Jun. 26, 2017, 8 pages.
Foreign Communication From A Counterpart Application, PCT Application No. PCT/CN2014/083172, English Translation of International Search Report dated Apr. 27, 2015, 2 pages.
Foreign Communication From A Counterpart Application, PCT Application No. PCT/CN2014/083172, English Translation of Written Opinion dated Apr. 27, 2015, 7 pages.
Machine Translation and Abstract of Japanese Publication No. JP2006050058, Feb. 16, 2006, 26 pages.
Foreign Communication From A Counterpart Application, Japanese Application No. 2017-502180, Japanese Office Action dated Apr. 3, 2018, 2 pages.
Foreign Communication From A Counterpart Application, Japanese Application No. 2017-502180, English Translation dated Japanese Office Action dated Apr. 3, 2018, 3 pages.
Foreign Communication From A Counterpart Application, European Application No. 14898985.8, European Office Action dated Jun. 1, 2018, 5 pages.

\* cited by examiner

BLUETOOTH COMMUNICATION METHOD AND DEVICE

CROSS-REFERENCE TO RELATED APPLICATIONS

This application is a U.S. national stage of International Patent Application No. PCT/CN2014/083172, filed on 28 Jul. 2014, which is hereby incorporated by reference in its entirety.

TECHNICAL FIELD

The present invention relates to the field of communications technologies, and in particular, to a Bluetooth® communication method and a device.

BACKGROUND

As electronic technologies develop, as a type of electronic product that can provide a completely new interaction manner to users and electronic devices and that can provide exclusive and customized services to each user, a wearable device such as a Bluetooth wristband or a Bluetooth watch imperceptibly affects daily life, work, and study of people, and facilitates the daily life, work, and study of the people.

When a communications device (with a Bluetooth function) receives a message (including a short message service message, an email, a call, or another message) sent by another device, the wearable device such as the Bluetooth wristband or the Bluetooth watch may receive, by means of Bluetooth, a notification sent by the communications device, where the notification is used to indicate that the communications device receives the message sent by the another device, and prompt a user that the communications device receives the message sent by the another device.

To expand application scenarios of the wearable device such as the Bluetooth wristband or the Bluetooth watch, in the industry, a detachable Bluetooth headset is installed on the wearable device, that is, the Bluetooth headset is used as a part of the wearable device, so that when the wearable device prompts the user that the communications device receives the message sent by the another device, the user may remove the Bluetooth headset from the wearable device, and directly answer a call or listen to information such as a short message service message or an email by using the Bluetooth headset.

At present, in a process in which the Bluetooth headset on the wearable device is used to answer a call or listen to a short message service message or read information such as an email, although the Bluetooth headset is installed on the wearable device as a part of the wearable device, the wearable device is not involved in data exchange between the Bluetooth headset and the communications device, and the Bluetooth headset needs to enable the Bluetooth function and establish a connection to the communications device, which results in relatively high power consumption of the Bluetooth headset.

SUMMARY

Embodiments of the present disclosure provide a Bluetooth communication method and a device, which can implement message listening by means of data exchange between a Bluetooth headset, a wearable device, and a communications device, and also reduce power consumption of the Bluetooth headset.

To achieve the foregoing objectives, the following technical solutions are used in the embodiments of the present disclosure.

A first aspect of the embodiments of the present disclosure provides a Bluetooth communication method, where a Bluetooth headset is a detachable Bluetooth device installed on a wearable device, a Bluetooth function of the Bluetooth headset is in a disabled state before the Bluetooth headset is detached from the wearable device, if the Bluetooth headset detects that the Bluetooth headset is detached from the wearable device, the Bluetooth headset enables the Bluetooth function, and the method includes detecting, by the wearable device, whether the Bluetooth headset is detached from the wearable device; and if the wearable device detects that the Bluetooth headset is detached from the wearable device, sending, by the wearable device, a first notification to a communications device, where the first notification is used to instruct the communications device to transmit a voice message to the Bluetooth headset by means of Bluetooth.

With reference to the first aspect, in a first possible implementation manner, the method further includes after the wearable device detects that the Bluetooth headset is detached from the wearable device, establishing, by the wearable device, a Bluetooth pairing with the Bluetooth headset; and acquiring and saving, by the wearable device, identifier information of the Bluetooth headset, where the identifier information of the Bluetooth headset includes address information of the Bluetooth headset.

With reference to the first aspect and the foregoing possible implementation manner, in another possible implementation manner, the first notification carries the identifier information of the Bluetooth headset, and the first notification is used to instruct the communications device to transmit, by means of Bluetooth, the voice message to the Bluetooth headset indicated by the identifier information of the Bluetooth headset.

A second aspect of the embodiments of the present disclosure provides a Bluetooth communication method, where a Bluetooth headset is a detachable Bluetooth device installed on a wearable device, a Bluetooth function of the Bluetooth headset is in a disabled state before the Bluetooth headset is detached from the wearable device, and the method includes if the Bluetooth headset detects that the Bluetooth headset is detached from the wearable device, enabling the Bluetooth function; receiving, by the Bluetooth headset, a Bluetooth pairing request from a communications device; establishing, by the Bluetooth headset, a Bluetooth pairing with the communications device according to the Bluetooth pairing request; and transmitting, by the Bluetooth headset, a voice message to the communications device by means of Bluetooth.

With reference to the second aspect, in a possible implementation manner, the Bluetooth pairing request is sent by the communications device according to identifier information of the Bluetooth headset; and before the receiving, by the Bluetooth headset, a Bluetooth pairing request from a communications device, the method further includes establishing, by the Bluetooth headset, a Bluetooth pairing with the wearable device; and sending, by the Bluetooth headset, the identifier information of the Bluetooth headset to the wearable device by means of Bluetooth, where the identifier information of the Bluetooth headset includes address information of the Bluetooth headset.

With reference to the second aspect and the foregoing possible implementation manner, in another possible implementation manner, the Bluetooth pairing request is sent by the communications device according to identifier information of the Bluetooth headset; the identifier information of the Bluetooth headset is prestored in the wearable device; and the identifier information of the Bluetooth headset includes address information of the Bluetooth headset.

With reference to the second aspect and the foregoing possible implementation manners, in another possible implementation manner, before the transmitting, by the Bluetooth headset, a voice message to the communications device by means of Bluetooth, the method further includes detecting, by the Bluetooth headset, whether the Bluetooth headset is in an attached state; and if the Bluetooth headset is in the attached state, transmitting, by the Bluetooth headset, the voice message to the communications device by means of Bluetooth.

A third aspect of the embodiments of the present disclosure provides a Bluetooth communication method, where a Bluetooth headset is a detachable Bluetooth device installed on a wearable device, a Bluetooth function of the Bluetooth headset is in a disabled state before the Bluetooth headset is detached from the wearable device, if the Bluetooth headset detects that the Bluetooth headset is detached from the wearable device, the Bluetooth headset enables the Bluetooth function, and the method includes receiving, by a communications device, a first notification from the wearable device, where the first notification is used to instruct the communications device to establish a Bluetooth pairing with the Bluetooth headset; sending, by the communications device, a Bluetooth pairing request to the Bluetooth headset according to identifier information of the Bluetooth headset, where the Bluetooth pairing request is used to request to establish a Bluetooth pairing with the communications device, and the identifier information of the Bluetooth headset is carried in the first notification, or the identifier information of the Bluetooth headset is prestored in the communications device; and transmitting, by the communications device, a voice message to the Bluetooth headset by means of Bluetooth.

A fourth aspect of the embodiments of the present disclosure provides a wearable device, where a Bluetooth headset is a detachable Bluetooth device installed on the wearable device, a Bluetooth function of the Bluetooth headset is in a disabled state before the Bluetooth headset is detached from the wearable device, if the Bluetooth headset detects that the Bluetooth headset is detached from the wearable device, the Bluetooth headset enables the Bluetooth function, and the wearable device includes a processor and a communications module, where the processor is configured to detect whether the Bluetooth headset is detached from the wearable device; and the communications module is configured to if the processor detects that the Bluetooth headset is detached from the wearable device, send a first notification to a communications device, where the first notification is used to instruct the communications device to transmit a voice message to the Bluetooth headset by means of Bluetooth.

With reference to the fourth aspect, in a possible implementation manner, the processor is further configured to after detecting that the Bluetooth headset is detached from the wearable device, establish a Bluetooth pairing with the Bluetooth headset; and acquire identifier information of the Bluetooth headset; and the wearable device further includes a storage, where the processor is further configured to save the identifier information of the Bluetooth headset in the storage; and the storage is configured to save the identifier information of the Bluetooth headset that is acquired by the processor, where the identifier information of the Bluetooth headset includes address information of the Bluetooth headset.

With reference to the fourth aspect and the foregoing possible implementation manner, in another possible implementation manner, the first notification sent by the communications module carries the identifier information of the Bluetooth headset, and the first notification sent by the communications module is used to instruct the communications device to transmit, by means of Bluetooth, the voice message to the Bluetooth headset indicated by the identifier information of the Bluetooth headset.

A fifth aspect of the embodiments of the present disclosure provides a Bluetooth headset, where the Bluetooth headset is a detachable Bluetooth device installed on a wearable device, a Bluetooth function of the Bluetooth headset is in a disabled state before the Bluetooth headset is detached from the wearable device, and the Bluetooth headset includes a processor and a communications module, where the processor is configured to detect whether the Bluetooth headset is detached from the wearable device, and if it is detected that the Bluetooth headset is detached from the wearable device, enable the Bluetooth function; the communications module is configured to receive a Bluetooth pairing request from a communications device; the processor is further configured to establish a Bluetooth pairing with the communications device according to the Bluetooth pairing request received by the communications module; and the communications module is further configured to after the processor establishes the Bluetooth pairing with the communications device, transmit a voice message to the communications device by means of Bluetooth.

With reference to the fifth aspect, in a possible implementation manner, the Bluetooth pairing request received by the communications module is sent by the communications device according to identifier information of the Bluetooth headset; the processor is further configured to before the communications module receives the Bluetooth pairing request from the communications device, establish a Bluetooth pairing with the wearable device; and the communications module is further configured to send the identifier information of the Bluetooth headset to the wearable device by means of Bluetooth, where the identifier information of the Bluetooth headset includes address information of the Bluetooth headset, and the identifier information of the Bluetooth headset is acquired by the processor by establishing the Bluetooth pairing with the wearable device.

With reference to the fifth aspect and the foregoing possible implementation manner, in another possible implementation manner, the Bluetooth pairing request received by the communications module is sent by the communications device according to identifier information of the Bluetooth headset; the identifier information of the Bluetooth headset is prestored in the wearable device; and the identifier information of the Bluetooth headset includes address information of the Bluetooth headset.

With reference to the fifth aspect and the foregoing possible implementation manners, in another possible implementation manner, the processor is further configured to before the voice message is transmitted to the communications device by means of Bluetooth, detect whether the Bluetooth headset is in an attached state; and the communications module is further configured to if the processor detects that the Bluetooth headset is in the attached state, transmit the voice message to the communications device by means of Bluetooth.

A sixth aspect of the embodiments of the present disclosure provides a communications device, where a Bluetooth headset is a detachable Bluetooth device installed on a wearable device, a Bluetooth function of the Bluetooth headset is in a disabled state before the Bluetooth headset is detached from the wearable device, if the Bluetooth headset detects that the Bluetooth headset is detached from the wearable device, the Bluetooth headset enables the Bluetooth function, and the communications device includes a communications module and a processor, where the communications module is configured to receive a first notification from the wearable device, where the first notification is used to instruct the communications device to establish a Bluetooth pairing with the Bluetooth headset; and the processor is configured to control, according to identifier information of the Bluetooth headset, the communications module to send a Bluetooth pairing request to the Bluetooth headset, where the Bluetooth pairing request is used to request to establish a Bluetooth pairing with the communications device, and the identifier information of the Bluetooth headset is carried in the first notification received by the communications module, or the identifier information of the Bluetooth headset is prestored in the communications device; and control the communications module to transmit a voice message to the Bluetooth headset by means of Bluetooth.

According to the Bluetooth communication method and the device that are provided in the embodiments of the present disclosure, a Bluetooth headset is a detachable Bluetooth device installed on a wearable device, a Bluetooth function of the Bluetooth headset is in a disabled state before the Bluetooth headset is detached from the wearable device, and if the Bluetooth headset detects that the Bluetooth headset is detached from the wearable device, the Bluetooth headset enables the Bluetooth function. The wearable device detects whether the Bluetooth headset is detached from the wearable device, and if the wearable device detects that the Bluetooth headset is detached from the wearable device, sends a first notification to a communications device, where the first notification is used to instruct the communications device to transmit a voice message to the Bluetooth headset by means of Bluetooth.

In the solutions, by means of data exchange between a Bluetooth headset, a wearable device, and a communications device, transmission of a voice message between the Bluetooth headset and the communications device can be implemented. Moreover, a Bluetooth function of the Bluetooth headset may be set to remain in a disabled state before the Bluetooth headset is detached from the wearable device, and the Bluetooth function is enabled only after the Bluetooth headset is detached from the wearable device (that is, when a user removes the Bluetooth headset from the wearable device, and the Bluetooth headset is possibly to be used), which can avoid a problem that power consumption of the Bluetooth headset is relatively high because the Bluetooth function of the Bluetooth headset is in an enabled state for a long time, and reduce the power consumption of the Bluetooth headset.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Embodiment 1

In this embodiment of the present disclosure, a Bluetooth headset is a detachable Bluetooth device installed on a wearable device, a Bluetooth function of the Bluetooth headset is in a disabled state before the Bluetooth headset is detached from the wearable device, and if the Bluetooth headset detects that the Bluetooth headset is detached from the wearable device, the Bluetooth headset enables the Bluetooth function of the Bluetooth headset.

Figure 1:
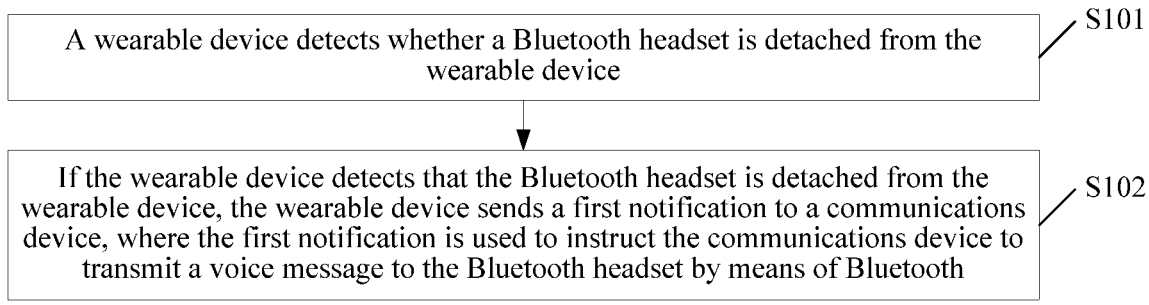
FIG. 1 is a method flowchart of a Bluetooth communication method according to Embodiment 1 of the present disclosure.

This embodiment of the present disclosure provides a Bluetooth communication method, which is applicable to a wearable device. As shown in FIG. 1, the Bluetooth communication method includes.

S101: The wearable device detects whether a Bluetooth headset is detached from the wearable device.

The wearable device is a Bluetooth device that is convenient for a user to wear and on which a Bluetooth headset can be installed. Certainly, the wearable device may further have other functions, which are not listed one by one in this embodiment of the present disclosure.

Exemplarily, the wearable device in this embodiment of the present disclosure may be any one of electronic devices having a Bluetooth function such as a Bluetooth watch, a Bluetooth wristband, or a Bluetooth headband.

It should be noted that the Bluetooth headset in this embodiment of the present disclosure may be installed on the wearable device by means of physical connection, or the Bluetooth headset may be installed on the wearable device by means of magnetic attraction. An installation manner between the Bluetooth headset and the wearable device is not limited in this embodiment of the present disclosure.

The wearable device may detect whether the Bluetooth headset is detached from the wearable device after receiving an incoming call message from the communications device. The incoming call message may be an indication message that is sent by the communications device to the wearable device by means of Bluetooth after the communications device has successfully established a Bluetooth pairing with the wearable device and the communications device receives a communication request initiated by another communications device.

Exemplarily, the communications device in this embodiment of the present disclosure may be a communications terminal having a Bluetooth function such as a mobile phone or a tablet computer.

The wearable device may detect, in real time, whether the Bluetooth headset is detached from the wearable device; or the wearable device may periodically detect whether the Bluetooth headset is detached from wearable device. Specifically, the wearable device may use a proximity sensor, a light sensor, or a capacitive sensor or simultaneously use multiple sensors to detect whether the Bluetooth headset is detached from the wearable device.

Exemplarily, a light sensor may be installed on a connection surface between the wearable device and the Bluetooth headset, and the light sensor may monitor a light intensity of a position of the light sensor in real time. When the Bluetooth headset is not detached from the wearable device, because the Bluetooth headset blocks light, the light intensity that can be monitored by the light sensor is relatively weak; and after the Bluetooth headset is detached from the wearable device, because the Bluetooth headset does not block the light any more, the light intensity that can be monitored by the light sensor becomes strong. The light sensor may generate a varied level according to a variation of the light intensity. A data processing chip in the wearable device may acquire a level variation, compare a light intensity that is represented by a level value acquired in real time with a preset intensity threshold, and determine whether the Bluetooth headset is detached from the wearable device. For example, if the light intensity that is represented by the level value acquired in real time is higher than the preset intensity threshold, the wearable device may determine that the Bluetooth headset is detached from the wearable device; or if the light intensity that is represented by the level value acquired in real time is lower than the preset intensity threshold, the wearable device may determine that the Bluetooth headset is not detached from the wearable device.

It should be noted that a method for detecting, by the wearable device, whether the Bluetooth headset is detached from the wearable device includes, but is not limited to, the method described above. A physical button may be disposed at a connection between the wearable device and the Bluetooth headset, and when the Bluetooth headset is detached from the wearable device, the physical button is released. The wearable device may determine, by detecting a status variation of the physical button in real time, whether the Bluetooth headset is detached from the wearable device. Another method for detecting, by the wearable device, whether the Bluetooth headset is detached from the wearable device is not described herein in detail in this embodiment of the present disclosure.

S102: If the wearable device detects that the Bluetooth headset is detached from the wearable device, the wearable device sends a first notification to a communications device, where the first notification is used to instruct the communications device to transmit a voice message to the Bluetooth headset by means of Bluetooth.

Exemplarily, a voice communication link in this embodiment of the present disclosure may include a Synchronous Connection Oriented (SCO) link. The SCO link is a Bluetooth physical link, and is mainly used to transmit data communication having a very high requirement on time, for example, perform synchronous speech transfer.

Further, the method in this embodiment of the present disclosure may further include after the wearable device detects that the Bluetooth headset is detached from the wearable device, establishing, by the wearable device, a Bluetooth pairing with the Bluetooth headset; and acquiring and saving, by the wearable device, identifier information of the Bluetooth headset. The identifier information of the Bluetooth headset includes address information of the Bluetooth headset.

It should be noted that in this embodiment of the present disclosure, an address of the Bluetooth headset is a Bluetooth device address (BDA), which can distinguish numerous Bluetooth headsets. The BDA is a 48-bit address, and each of all Bluetooth devices has a unique 48-bit BDA.

The BDA may be divided into three parts: a 24-bit lower address part (LAP), an 8-bit upper address part (UAP), and a 16-bit non-significant address part (NAP). Addressing space of the Bluetooth device is formed by combining the 8-bit UAP and the 24-bit LAP, and a 24-bit address formed by combining a 16-bit NAP and an 8-bit UAP may be used as a unique identification code for a Bluetooth device vendor, and 24-bit addresses are allocated to different Bluetooth device vendors by a Bluetooth authority.

Certainly, the identifier information of the Bluetooth headset in this embodiment of the present disclosure may further include a name of the Bluetooth headset, a Bluetooth clock (Bluetooth Clock) of the Bluetooth headset, and the like. Specific content of the identifier information of the Bluetooth headset is not limited in this embodiment of the present disclosure. The Bluetooth clock may be an internal system clock of the Bluetooth device, and each Bluetooth device has an internal system clock for determining a time sequence and frequency hopping of a transceiver of the Bluetooth device.

It should be noted that in an application scenario in this embodiment of the present disclosure, the first notification carries the identifier information of the Bluetooth headset. In this application scenario, after receiving the first notification, the communications device may transmit, by means of Bluetooth, the voice message to the Bluetooth headset corresponding to the identifier information of the Bluetooth headset that is carried in the first notification.

In another application scenario in this embodiment of the present disclosure, the identifier information of the Bluetooth headset is prestored in the communications device. In this application scenario, after receiving the first notification, the communications device may transmit, by means of Bluetooth, the voice message to the Bluetooth headset corresponding to the identifier information of the Bluetooth headset that is prestored in the communications device.

According to the Bluetooth communication method provided in this embodiment of the present disclosure, a wearable device may send a first notification to a communications device after detecting that a Bluetooth headset is detached from the wearable device, to instruct the communications device to transmit a voice message to the Bluetooth headset by means of Bluetooth. By means of data exchange between the Bluetooth headset, the wearable device, and the communications device, transmission of a voice message between the Bluetooth headset and the communications device can be implemented. Moreover, a Bluetooth function of the Bluetooth headset may be set to remain in a disabled state before the Bluetooth headset is detached from the wearable device, and the Bluetooth function is enabled only after the Bluetooth headset is detached from the wearable device (that is, when a user removes the Bluetooth headset from the wearable device, and the Bluetooth headset is possibly to be used), which can avoid a problem that power consumption of the Bluetooth headset is relatively high because the Bluetooth function of the Bluetooth headset is in an enabled state for a long time, and reduce the power consumption of the Bluetooth headset.

Embodiment 2

A Bluetooth headset in this embodiment of the present disclosure is a detachable Bluetooth device installed on a wearable device, and a Bluetooth function of the Bluetooth headset is in a disabled state before the Bluetooth headset is detached from the wearable device.

Figure 2:
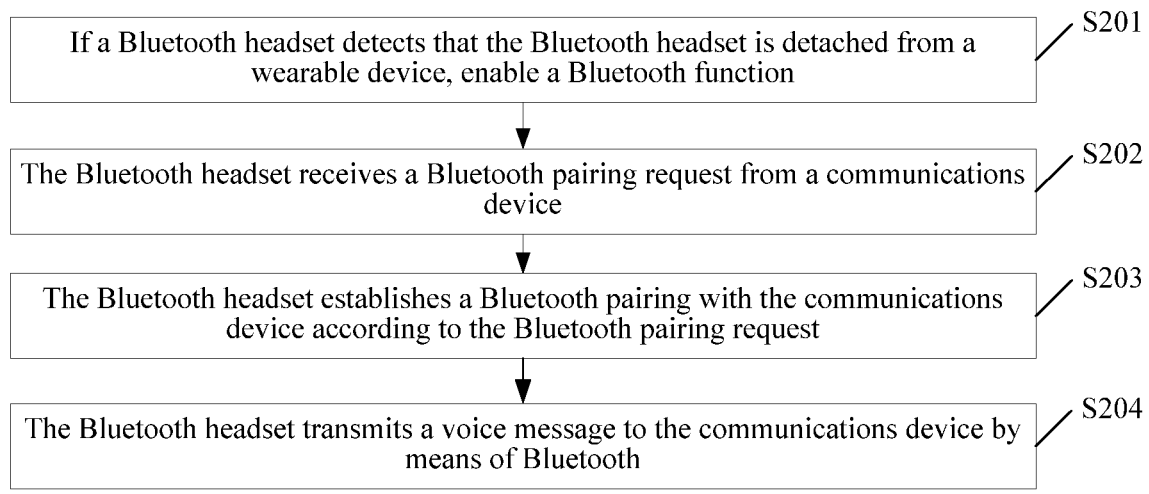
FIG. 2 is a method flowchart of a Bluetooth communication method according to Embodiment 2 of the present disclosure.

This embodiment of the present disclosure provides a Bluetooth communication method, which is applicable to a Bluetooth headset. As shown in FIG. 2, the Bluetooth communication method includes the following steps.

S201: If a Bluetooth headset detects that the Bluetooth headset is detached from a wearable device, enable a Bluetooth function.

It should be noted that for a specific method for detecting, by the Bluetooth headset, whether the Bluetooth headset is detached from the wearable device, reference may be made to related descriptions in other method embodiments of the present disclosure, and is not described herein again in detail in this embodiment.

S202: The Bluetooth headset receives a Bluetooth pairing request from a communications device.

In this embodiment of the present disclosure, after receiving a first notification from the wearable device, the communications device sends the Bluetooth pairing request to the Bluetooth headset according to identifier information of the Bluetooth headset. The identifier information of the Bluetooth headset is carried in the first notification; or the identifier information of the Bluetooth headset is prestored in the communications device.

The identifier information of the Bluetooth headset that is carried in the first notification may be identifier information that is sent by the Bluetooth headset to the wearable device by means of Bluetooth after the Bluetooth headset establishes a Bluetooth pairing with the wearable device; or the identifier information of the Bluetooth headset that is carried in the first notification may be identifier information prestored in the wearable device.

S203: The Bluetooth headset establishes a Bluetooth pairing with the communications device according to the Bluetooth pairing request.

Exemplarily, a Bluetooth pairing manner between the Bluetooth headset and the communications device includes, but is not limited to, a legacy Bluetooth discovery and pairing manner, or a Near Field Communication (NFC) Bluetooth pairing manner.

A specific process of the legacy Bluetooth discovery and pairing manner may be a master device discovers a slave device; the master device selects a slave device to be paired; the master device sends a Bluetooth pairing request to the selected slave device to be paired; the slave device accepts a Bluetooth pairing request of the master device; the master device and the slave device perform pairing authentication; and the master device is successfully paired with the slave device.

NFC is a short-distance high-frequency wireless communications technology, and allows non-contact point-to-point data transmission between electronic devices (within ten centimeters). The NFC Bluetooth pairing manner may be specifically a combination of an NFC technology and a Bluetooth technology, and aims to simplify a process of establishing a connection by means of Bluetooth pairing and improve its rate. A specific pairing process may be when a master device (having an NFC function) approaches a slave device (having an NFC function), the master device and the slave device exchange Bluetooth pairing parameters by using the NFC protocol.

S204: The Bluetooth headset transmits a voice message to the communications device by means of Bluetooth.

A method for transmitting the voice message to the communications device by the Bluetooth headset by means of Bluetooth may include establishing, by the Bluetooth headset, a voice communication link between the Bluetooth headset and the communications device by means of Bluetooth, and transmitting the voice message to the communications device by using the voice communication link.

Exemplarily, a method for establishing the voice communication link between the Bluetooth headset and the communications device by the Bluetooth headset by means of Bluetooth may include sending, by the Bluetooth headset, a message listening command to the communications device by means of Bluetooth, where the message listening command is used to request to establish the voice communication link between the Bluetooth headset and the communications device; and receiving, by the Bluetooth headset, a message listening response from the communications device, where the message listening response is used to indicate that the voice communication link is already established.

Further, optionally, to ensure communication quality when a user transmits the voice message to the communications device by using the Bluetooth headset, the Bluetooth headset may detect, before exchanging data with the communications device by means of a Bluetooth connection, whether the user is wearing the Bluetooth headset (that is, whether the Bluetooth headset is in an attached state), establish the voice communication link only after the user is wearing the Bluetooth headset, and transmit the voice message to the communications device by using the voice communication link.

According to the Bluetooth communication method provided in this embodiment of the present disclosure, a Bluetooth function of a Bluetooth headset may be set to remain in a disabled state before the Bluetooth headset is detached from a wearable device, and the Bluetooth headset enables the Bluetooth function only after the Bluetooth headset is detached from the wearable device (that is, when a user removes the Bluetooth headset from the wearable device, and the Bluetooth headset is possibly to be used), which can avoid a problem that power consumption of the Bluetooth headset is relatively high because the Bluetooth function of the Bluetooth headset is in an enabled state for a long time, and reduce the power consumption of the Bluetooth headset.

Embodiment 3

In this embodiment of the present disclosure, a Bluetooth headset is a detachable Bluetooth device installed on a wearable device, a Bluetooth function of the Bluetooth headset is in a disabled state before the Bluetooth headset is detached from the wearable device, and if the Bluetooth headset detects that the Bluetooth headset is detached from the wearable device, the Bluetooth headset enables the Bluetooth function.

Figure 3:
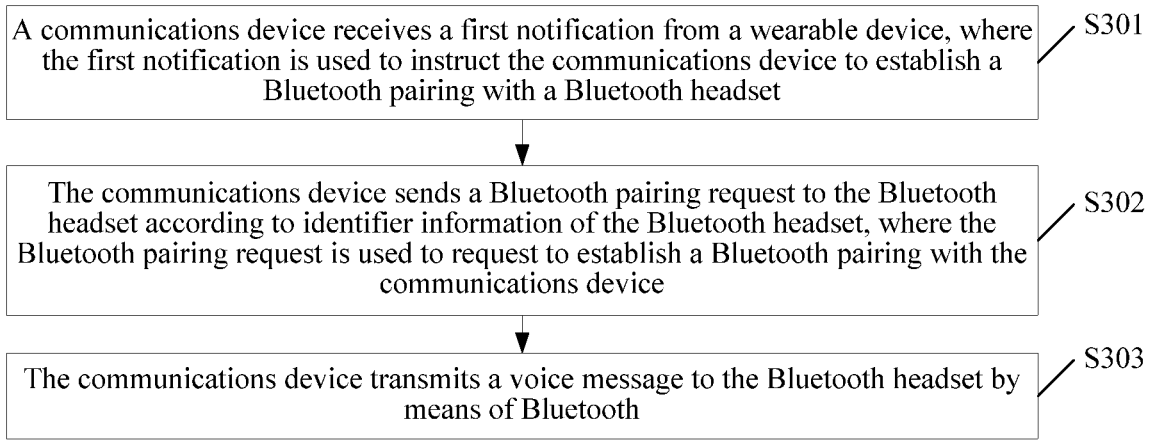
FIG. 3 is a method flowchart of a Bluetooth communication method according to Embodiment 3 of the present disclosure.

This embodiment of the present disclosure provides a Bluetooth communication method, which is applicable to a communications device. As shown in FIG. 3, the Bluetooth communication method includes the following steps.

S301: A communications device receives a first notification from a wearable device, where the first notification is used to instruct the communications device to establish a Bluetooth pairing with a Bluetooth headset.

In an application scenario in this embodiment of the present disclosure, the first notification carries identifier information of the Bluetooth headset. For specific content of the identifier information of the Bluetooth headset, reference may be made to related descriptions in other embodiments of the present disclosure, and details are not described herein again in this embodiment.

It may be understood that the first notification is sent by the wearable device to the communications device after the wearable device detects that the Bluetooth headset is detached from the wearable device.

S302: The communications device sends a Bluetooth pairing request to the Bluetooth headset according to identifier information of the Bluetooth headset, where the Bluetooth pairing request is used to request to establish a Bluetooth pairing with the communications device.

In another application scenario in this embodiment of the present disclosure, the identifier information of the Bluetooth headset is prestored in the communications device.

It may be understood that because the Bluetooth headset enables a Bluetooth function after it is detected that the Bluetooth headset is detached from the wearable device, and the wearable device sends the first notification to the communications device after detecting that the Bluetooth headset is detached from the wearable device, after the communications device receives the first notification, the Bluetooth function of the Bluetooth headset is in an enabled state, and the communications device may send the Bluetooth pairing request to the Bluetooth headset corresponding to the identifier information of the Bluetooth headset, establish a Bluetooth pairing with the Bluetooth headset, and transmit a voice message to the Bluetooth headset by means of Bluetooth.

S303: The communications device transmits a voice message to the Bluetooth headset by means of Bluetooth.

The transmitting, by the communications device, a voice message to the Bluetooth headset by means of Bluetooth may include receiving, by the communications device, a voice message from the Bluetooth headset by means of Bluetooth; and sending, by the communications device, the voice message to the Bluetooth headset by means of Bluetooth.

According to the Bluetooth communication method provided in this embodiment of the present disclosure, a communications device may transmit a voice message to a Bluetooth headset by means of Bluetooth after receiving a first notification sent by the communication device. By means of data exchange between the Bluetooth headset, the wearable device, and the communications device, transmission of a voice message between the Bluetooth headset and the communications device can be implemented. Moreover, a Bluetooth function of the Bluetooth headset may be set to remain in a disabled state before the Bluetooth headset is detached from the wearable device, and the Bluetooth function is enabled only after the Bluetooth headset is detached from the wearable device (that is, when a user removes the Bluetooth headset from the wearable device, and the Bluetooth headset is possibly to be used), which can avoid a problem that power consumption of the Bluetooth headset is relatively high because the Bluetooth function of the Bluetooth headset is in an enabled state for a long time, and reduce the power consumption of the Bluetooth headset.

Embodiment 4

In this embodiment of the present disclosure, a Bluetooth function of a Bluetooth headset is in a disabled state before the Bluetooth headset is detached from a wearable device.

Figure 4:
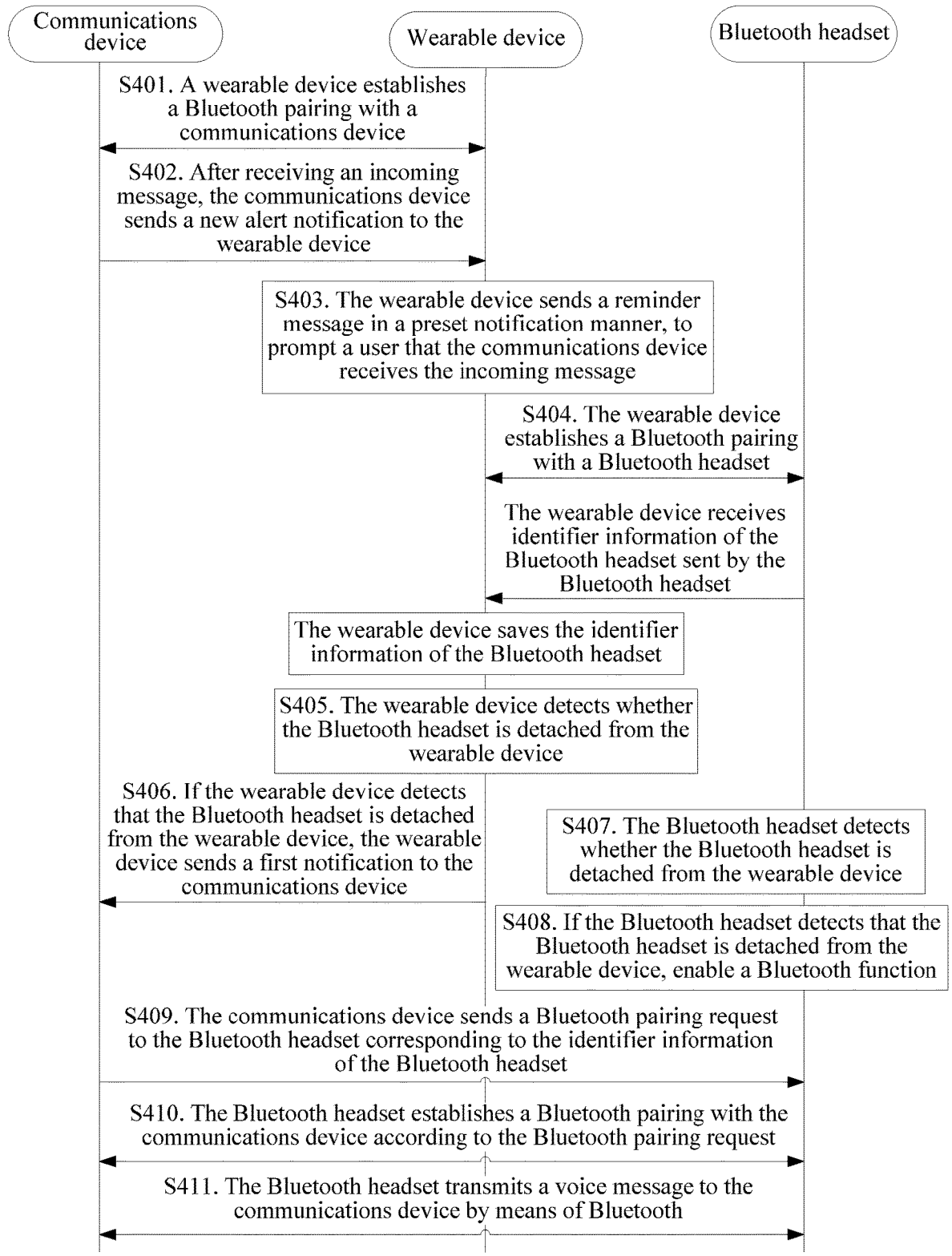
FIG. 4 is a method flowchart of a Bluetooth communication method according to Embodiment 4 of the present disclosure.

This embodiment of the present disclosure provides a Bluetooth communication method, as shown in FIG. 4, including the following steps.

S401: A wearable device establishes a Bluetooth pairing with a communications device.

It should be noted that for a specific method for establishing the Bluetooth pairing with the communications device by the wearable device, refer to a method, in other method embodiments of the present disclosure, for establishing the Bluetooth pairing with the communications device by the Bluetooth headset, and details are not described herein again in this embodiment.

Further, after the wearable device successfully establishes the Bluetooth pairing with the communications device, mutual capability information further needs to be exchanged, and then data exchange is performed based on the mutual capability information (where exchanged data may include a voice message). A specific process may include sending, by the wearable device, a reading capability request to the communications device; after the communications device receives the reading capability request, sending, by the communications device, capability information of the communications device to the wearable device; after the wearable device receives the capability information of the communications device, sending, by the wearable device, capability information of the wearable device to the communications device; after the communications device receives the capability information of the wearable device, returning, by the communications device, acknowledgement information to the wearable device; and completing establishment of a Bluetooth connection between the communications device and the wearable device.

S402: After receiving an incoming call message, the communications device sends a new alert notification to the wearable device.

In this embodiment of the present disclosure, the incoming call message received by the communications device includes, but is not limited to, one or more of an incoming call, a calendar reminder, a warning, an email, news, voice information, a short message service message, and a missed call reminder message.

Exemplarily, the communications device may send different types of new alert notifications to the wearable device after receiving different types of incoming call messages. Each type of incoming call message may correspond to one new alert notification, and each new alert notification corresponds to one notification manner, or each new alert notification corresponds to one notification means of a notification manner, where a full name of the new alert in English is New alert.

For example, when the incoming call message is an incoming call, the communications device may send a first new alert to the wearable device; when the incoming call message is a short message service message, the communications device may send a second new alert to the wearable device; and when the incoming call message is an email, the communications device may send a third new alert to the wearable device. The first new alert, the second new alert, and the third new alert may be separately three types of different alert messages.

S403: The wearable device sends a prompter message in a preset notification manner, to prompt a user that the communications device receives the incoming call message.

After receiving the new alert notification from the communications device, the wearable device may send the prompter message in the notification manner (for example, a ringing manner, a vibration manner, a voice announcement manner, and a manner of both ringing and vibration) preset by the user, to prompt the user that the communications device receives the incoming call message.

Exemplarily, in this embodiment of the present disclosure, each type of incoming call message may correspond to one new alert notification, and each new alert notification correspond to one notification manner.

For example, when the incoming call message is an incoming call, the communications device may send a first new alert to the wearable device, and the wearable device may send the prompter message in a first notification manner (for example, the ringing manner), to prompt the user that the communications device receives the incoming call. When the incoming call message is a short message service message, the communications device may send a second new alert to the wearable device, and the wearable device may send the prompter message in a second notification manner (for example, the vibration manner), to prompt the user that the communications device receives the short message service message. When the incoming call message is an email, the communications device may send a third new alert to the wearable device, and the wearable device may send the prompter message in a third notification manner (for example, the manner of both ringing and vibration), to prompt the user that the communications device receives the email.

Exemplarily, in this embodiment of the present disclosure, each type of incoming call message may correspond to one new alert notification, and each new alert notification correspond to one notification means of a notification manner.

For example, when the incoming call message is an incoming call, the communications device may send a first new alert to the wearable device, and the wearable device may send the prompter message by using a first notification means (for example, a ringtone 1) of a first notification manner (for example, the ringing manner), to prompt the user that the communications device receives the incoming call. When the incoming call message is a short message service message, the communications device may send a second new alert to the wearable device, and the wearable device may send the prompter message by using a second notification means (for example, a ringtone 2) of the first notification manner (for example, the ringing manner), to prompt the user that the communications device receives the short message service message. When the incoming call message is an email, the communications device may send a third new alert to the wearable device, and the wearable device may send the prompter message by using a third notification means (for example, a ringtone 3) of the first notification manner (for example, the ringing manner), to prompt the user that the communications device receives the email.

It should be noted that the preset notification manner in this embodiment of the present disclosure includes, but is not limited to, the notification manners described above, and other notification manners are not described herein in detail in this embodiment of the present disclosure.

The user may directly set, on a side of the wearable device, the preset notification manner used by the wearable device; or the user may also set, on a side of the communications device, the preset notification manner used by the wearable device; or the user may also set that the wearable device automatically selects a corresponding notification manner according to a setting on a side of the communications device or current state information of the wearable device.

S404: The wearable device establishes a Bluetooth pairing with a Bluetooth headset; and the wearable device receives identifier information of the Bluetooth headset that is sent by the Bluetooth headset, and saves the identifier information of the Bluetooth headset.

It should be noted that for a specific method for establishing the Bluetooth pairing with the Bluetooth headset by the wearable device, reference may be made to a method, in other method embodiments of the present disclosure, for establishing the pairing with the communications device by the Bluetooth headset, and details are not described herein again in this embodiment of the present disclosure. After successfully establishing the Bluetooth pairing with the Bluetooth headset, the wearable device may receive the identifier information of the Bluetooth headset that is sent by the Bluetooth headset.

S405: The wearable device detects whether the Bluetooth headset is detached from the wearable device.

After receiving the new alert notification sent by the communications device, the wearable device may detect whether the Bluetooth headset is detached from the wearable device.

S406: If the wearable device detects that the Bluetooth headset is detached from the wearable device, the wearable device sends a first notification to the communications device.

In an application scenario in this embodiment of the present disclosure, the first notification carries the identifier information of the Bluetooth headset.

In a case of the application scenario, the wearable device may establish the Bluetooth pairing with the Bluetooth headset in advance, to acquire and save the identifier information of the Bluetooth headset.

In another case of the application scenario, instead of establishing the Bluetooth pairing with the Bluetooth headset in advance, the wearable device may establish the Bluetooth pairing with the Bluetooth headset after detecting that the Bluetooth headset is detached from the wearable device, to acquire and save the identifier information of the Bluetooth headset.

S407: The Bluetooth headset detects whether the Bluetooth headset is detached from the wearable device.

It should be noted that in this embodiment of the present disclosure, a method for detecting, by the Bluetooth headset, whether the Bluetooth headset is detached from the wearable device is similar to a method for detecting, by the wearable device, whether the Bluetooth headset is detached from the wearable device, and is not described herein in detail in this embodiment of the present disclosure.

S408: If the Bluetooth headset detects that the Bluetooth headset is detached from the wearable device, enable a Bluetooth function.

It should be noted that in this embodiment of the present disclosure, step S405 and step S406 may be performed first, and then step S407 and step S408 are performed; or step S407 and step S408 may be performed first, and then step S405 and step S406 are performed; or step S405 and step S406 may be performed at the same time when step S407 and step S408 are performed. A sequence of performing step S405 and step S406 and performing step S407 and step S408 is not limited in this embodiment of the present disclosure.

S409: The communications device sends a Bluetooth pairing request to the Bluetooth headset corresponding to the identifier information of the Bluetooth headset.

The identifier information of the Bluetooth headset may be sent to the communications device by the wearable device by adding the identifier information of the Bluetooth headset to the first notification; or the identifier information of the Bluetooth headset may be prestored in the communications device.

S410: The Bluetooth headset establishes a Bluetooth pairing with the communications device according to the Bluetooth pairing request.

In an application scenario of this embodiment of the present disclosure, to shorten a preparation time that is before the Bluetooth headset communicates with the communications device, and improve communication efficiency, the communications device may establish a Bluetooth pairing with the Bluetooth headset in advance, so that after the communications device receives the identifier information of the Bluetooth headset and determines that the Bluetooth headset is in an enabled state (that is, the Bluetooth headset is detached from the wearable device), a voice message may be transmitted to the communications device in time by means of Bluetooth.

In another application scenario in this embodiment of the present disclosure, instead of establishing a pairing with the Bluetooth headset in advance, the communications device establishes the Bluetooth pairing with the Bluetooth headset after receiving the first notification.

S411: The Bluetooth headset transmits a voice message to the communications device by means of Bluetooth.

The Bluetooth headset may send a message listening command to the communications device, where the message listening command is used to request to establish a voice communication link between the Bluetooth headset and the communications device; and after receiving the message listening command, the communications device returns a message listening response to the Bluetooth headset, where the message listening response is used to indicate that the voice communication link is already established.

Further, optionally, to ensure communication quality when the user uses the Bluetooth headset to listen to a voice message of the communications device, before the transmitting, by the Bluetooth headset, a voice message to the communications device by means of Bluetooth, the method in this embodiment of the present disclosure may further include detecting, by the Bluetooth headset, whether the Bluetooth headset is in an attached state. In this embodiment of the present disclosure, that the Bluetooth headset is in the attached state may include fixing, by the user, the Bluetooth headset to an ear part of the user in a manner of wearing the Bluetooth headset; or attaching, by the user, the Bluetooth headset to an ear part of the user in a wearing manner other than the manner of wearing the Bluetooth headset.

Exemplarily, the Bluetooth headset may use a proximity sensor, a light sensor, or a temperature sensor or simultaneously use multiple sensors to detect whether the Bluetooth headset is in an attached state.

For example, when the user wears the Bluetooth headset, a light sensor may be installed on a contact surface between the Bluetooth headset and the user (an ear of the user), and the light sensor may monitor a light intensity of a position of the light sensor in real time. When the user wears the Bluetooth headset (that is, the Bluetooth headset is in the attachedstate), because the Bluetooth headset is in contact with the user, light on the contact surface between the Bluetooth headset and the user is blocked, and light intensity that can be monitored by the light sensor is relatively weak; and when the user is not wearing the Bluetooth headset (that is, the Bluetooth headset is not in the attachedstate), the light on the contact surface between the Bluetooth headset and the user is not blocked, and the light intensity that can be monitored by the light sensor becomes strong. The light sensor may generate a varied level according to a variation of the light intensity. A data processing chip in the Bluetooth headset may acquire a level variation, compare a light intensity that is represented by a level value acquired in real time with a preset intensity threshold, and determine whether the Bluetooth headset is in the attachedstate. For example, if the light intensity that is represented by the level value acquired in real time is higher than the preset intensity threshold, the Bluetooth headset may determine that the Bluetooth headset is not in the attachedstate; or if the light intensity that is represented by the level value acquired in real time is lower than the preset intensity threshold, the Bluetooth headset may determine that the Bluetooth headset is in the attachedstate.

It should be noted that a method for detecting, by the Bluetooth headset, whether the Bluetooth headset is in the attachedstate includes, but is not limited to, the method described above. Another method for detecting, by the Bluetooth headset, whether the Bluetooth headset is in the attachedstate is described herein in detail in this embodiment of the present disclosure.

Correspondingly, the transmitting, by the Bluetooth headset, a voice message to the communications device by means of Bluetooth may be specifically if the Bluetooth headset is in the attachedstate, transmitting, by the Bluetooth headset, the voice message to the communications device by means of Bluetooth.

It should be noted that in this embodiment of the present disclosure, the transmitting, by the Bluetooth headset, a voice message to the communications device by means of Bluetooth may include receiving, by the Bluetooth headset by means of Bluetooth, a voice message sent by the communications device; and sending, by the Bluetooth headset, the voice message to the communications device by means of Bluetooth.

According to the Bluetooth communication method provided in this embodiment of the present disclosure, data exchange between a Bluetooth headset, a wearable device, and a communications device can be implemented. Moreover, a Bluetooth function of the Bluetooth headset may be set to remain in a disabled state before the Bluetooth headset is detached from the wearable device, and the Bluetooth function is enabled only after the Bluetooth headset is detached from the wearable device (that is, when a user removes the Bluetooth headset from the wearable device, and the Bluetooth headset is possibly to be used), which can avoid a problem that power consumption of the Bluetooth headset is relatively high because the Bluetooth function of the Bluetooth headset is in an enabled state for a long time, and reduce the power consumption of the Bluetooth headset.

Embodiment 5

In this embodiment, a wearable device may be a Bluetooth device having an independent communication function, and a Bluetooth function of a Bluetooth headset is in a disabled state before the Bluetooth headset is detached from the wearable device.

Figure 5:
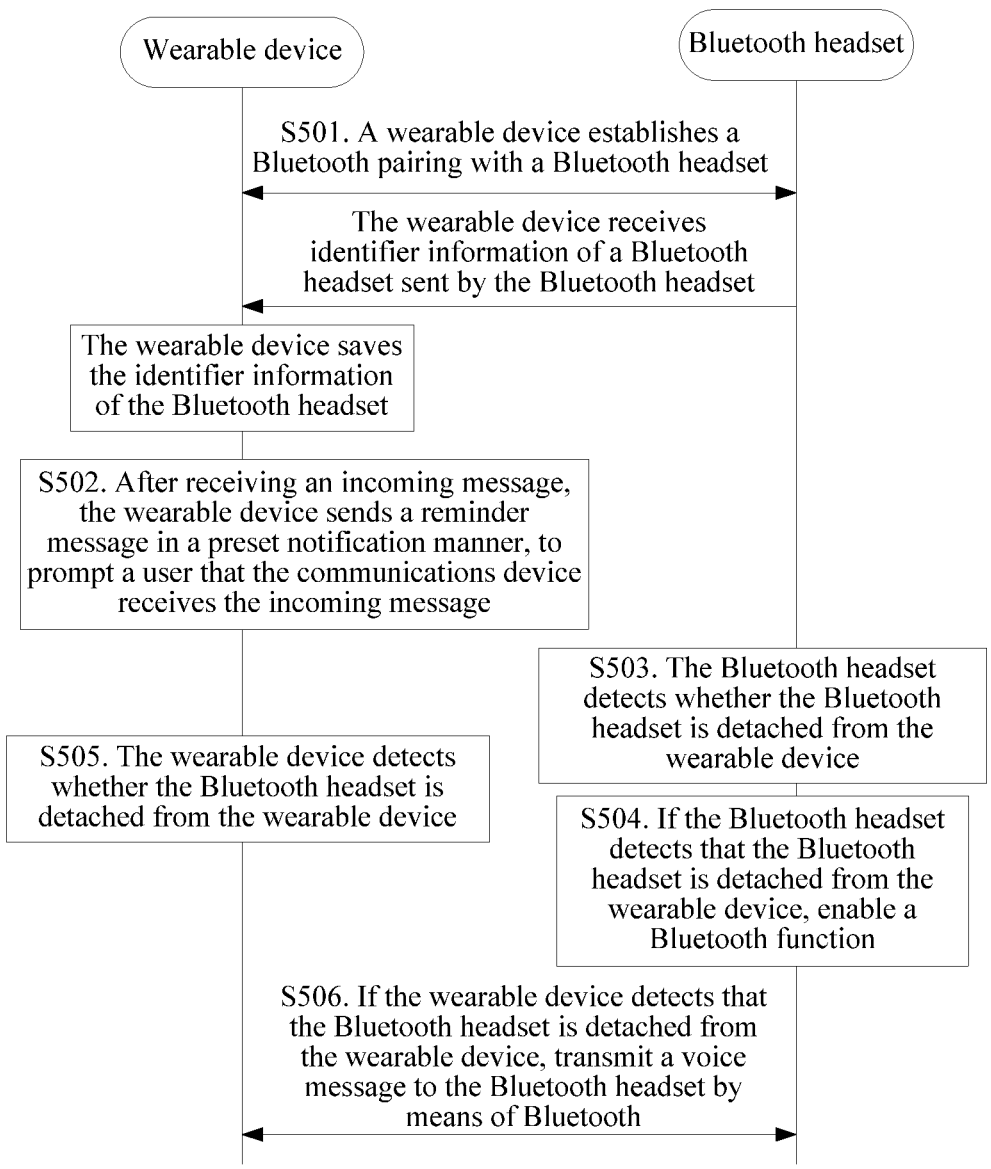
FIG. 5 is a method flowchart of a Bluetooth communication method according to Embodiment 5 of the present disclosure.

This embodiment of the present disclosure provides a Bluetooth communication method. As shown in FIG. 5, the Bluetooth communication method includes:

S501: A wearable device establishes a Bluetooth pairing with a Bluetooth headset, and the wearable device receives identifier information of the Bluetooth headset that is sent by the Bluetooth headset, and saves the identifier information of the Bluetooth headset.

It should be noted that in this embodiment, for a method for establishing the Bluetooth pairing with the Bluetooth headset by the wearable device, and acquiring and saving the identifier information of the Bluetooth headset, reference may be made to related descriptions in other embodiments of the present disclosure, and details are not described herein again in this embodiment of the present disclosure.

S502. After receiving an incoming call message, the wearable device sends a prompter message in a preset notification manner, to prompt a user that the wearable device receives the incoming call message.

The incoming call message received by the wearable device is sent by another communications device to the wearable device.

It should be noted that for a type and specific content of the incoming call message in this embodiment, reference may be made to related descriptions in other method embodiments of the present disclosure; in this embodiment, for a method for sending the prompter message in the preset notification manner by the wearable device, to prompt the user that the wearable device receives the incoming call message, reference may be made to related descriptions in other embodiments of the present disclosure; and details are not described herein again in this embodiment.

S503: The Bluetooth headset detects whether the Bluetooth headset is detached from the wearable device.

S504: If the Bluetooth headset detects that the Bluetooth headset is detached from the wearable device, enable a Bluetooth function.

S505: The wearable device detects whether the Bluetooth headset is detached from the wearable device.

It should be noted that in this embodiment, for both a method for detecting, by the wearable device, whether the Bluetooth headset is detached from the wearable device and a method for detecting, by the Bluetooth headset, whether the Bluetooth headset is detached from the wearable device, reference may be made to related descriptions in other method embodiments of the present disclosure, and details are not described herein again in this embodiment.

It should be noted that in this embodiment of the present disclosure, step S503 and step S504 may be performed first, and then step S505 is performed; or step S505 may be performed first, and then step S503 and step S504 are performed; or step S503 and step S504 may be performed at the same time when step S505 is performed. A sequence of performing step S503 and step S504 and performing step S505 is not limited in this embodiment of the present disclosure.

S506: If the wearable device detects that the Bluetooth headset is detached from the wearable device, a voice message is transmitted to the Bluetooth headset by means of Bluetooth.

Further, optionally, to ensure communication quality when the user uses the Bluetooth headset to listen to a voice message of the communications device, before the transmitting, by the wearable device, a voice message to the Bluetooth headset by means of Bluetooth, the method in this embodiment of the present disclosure may further include detecting, by the Bluetooth headset, whether the Bluetooth headset is in an attached state.

Correspondingly, the transmitting, by the wearable device, a voice message to the Bluetooth headset by means of Bluetooth may be specifically, if the Bluetooth headset is in the attachedstate, transmitting, by the wearable device, the voice message to the Bluetooth headset by means of Bluetooth.

According to the Bluetooth communication method provided in this embodiment of the present disclosure, a Bluetooth function of a Bluetooth headset may be set to remain in a disabled state before the Bluetooth headset is detached from a wearable device, and the Bluetooth function is enabled only after the Bluetooth headset is detached from the wearable device (that is, when a user removes the Bluetooth headset from the wearable device, and the Bluetooth headset is possibly to be used), which can avoid a problem that power consumption of the Bluetooth headset is relatively high because the Bluetooth function of the Bluetooth headset is in an enabled state for a long time, and reduce the power consumption of the Bluetooth headset.

Embodiment 6

This embodiment of the present disclosure provides a wearable device 60, where a Bluetooth headset is a detachable Bluetooth device installed on the wearable device 60, a Bluetooth function of the Bluetooth headset is in a disabled state before the Bluetooth headset is detached from the wearable device 60, and if the Bluetooth headset detects that the Bluetooth headset is detached from the wearable device 60, the Bluetooth headset enables the Bluetooth function.

Figure 6:
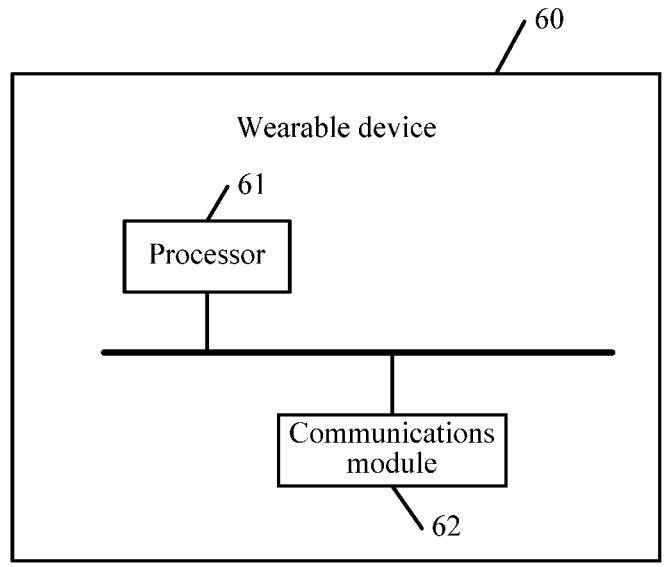
FIG. 6 is a structural diagram of a wearable device according to Embodiment 6 of the present disclosure.

As shown in FIG. 6, the wearable device 60 in this embodiment of the present disclosure includes a processor 61 and a communications module 62.

The processor 61 is configured to detect whether the Bluetooth headset is detached from the wearable device 60.

The communications module 62 is configured to if the processor 61 detects that the Bluetooth headset is detached from the wearable device 60, send a first notification to a communications device, where the first notification is used to instruct the communications device to transmit a voice message to the Bluetooth headset by means of Bluetooth.

The communications module 62 is further configured to receive a new alert notification sent by the communications device, where the new alert notification is sent to the wearable device 60 by the communications device after the communications device receives an incoming call message sent by another device.

The processor 61 may monitor, in real time, information received by the communications module 62; and the processor 61 may detect, after the communications module 62 receives the new alert notification, whether the Bluetooth headset is detached from the wearable device 60.

In this embodiment of the present disclosure, the communications module 62 may be a Bluetooth module configured to exchange data with an external device.

The Bluetooth module is a printed circuit board assembly (PCBA) on which a Bluetooth function is integrated, may be used for short-distance wireless communication, and may be classified into a Bluetooth data module and a Bluetooth voice module according to functions. The PCBA is a PCB that is obtained after a component is mounted on a blank printed circuit board (PCB) by using a surface mount technology (SMT) and after a component is inserted by means of dual inline-pin package (DIP). The Bluetooth module may be integrated on a Bluetooth chip. Certainly, the communications module further includes a radio frequency (RF) circuit corresponding to the Bluetooth module. The RF radio frequency circuit is configured to receive and send a signal during an information receiving and sending process or during a call.

It should be noted that the communications module 62 in this embodiment of the present disclosure may also be a communication interface configured to exchange data with an external device. The communications module may include two communication interfaces a sending interface configured to send data to the external device and a receiving interface configured to receives data from the external device, that is, the wearable device 60 may separately implement receiving and sending of data by using two different communication interfaces. Certainly, the communications module may integrate a data receiving function and a data sending function on one communication interface, and the communication interface has the data receiving function and the data sending function. The communication interface may be integrated on a Bluetooth chip or an NFC chip.

Figure 7:
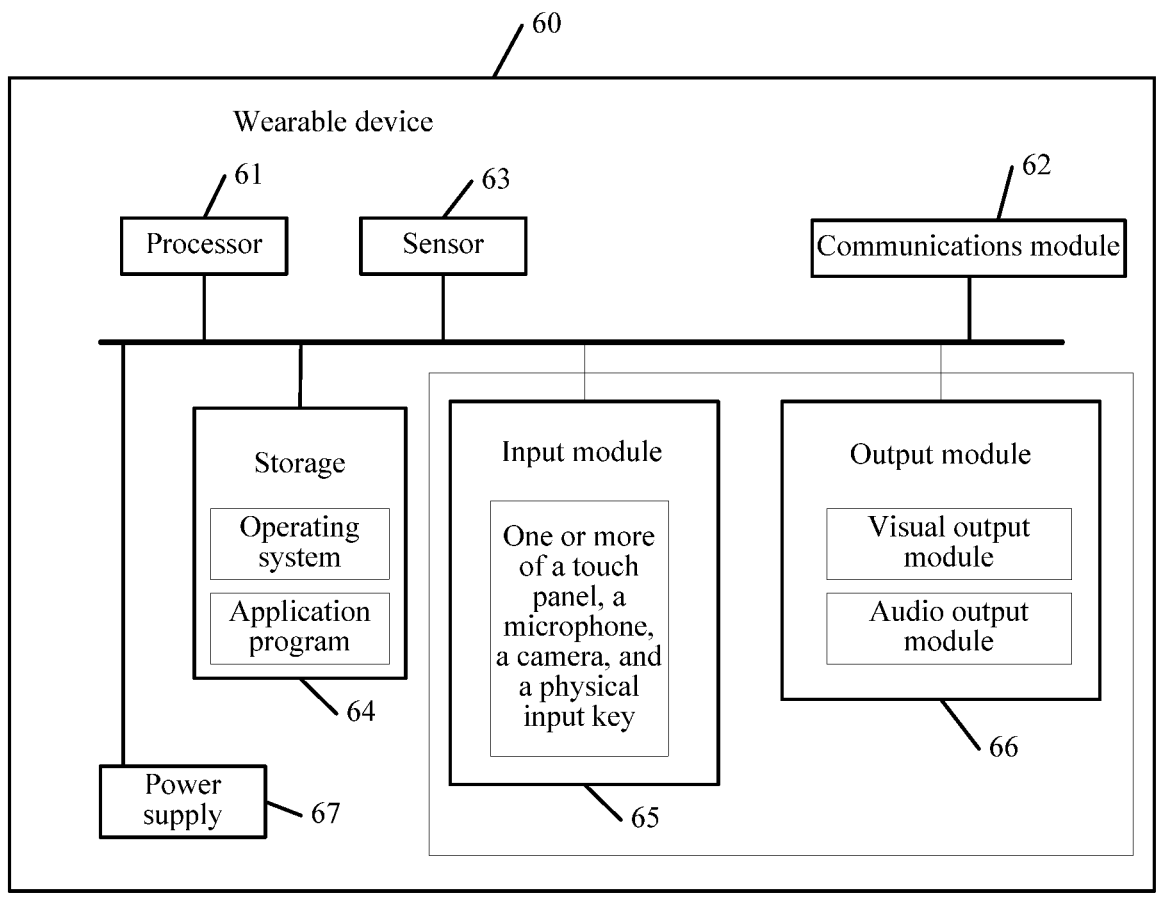
FIG. 7 is a structural diagram of another wearable device according to Embodiment 6 of the present disclosure.

Further, based on the wearable device 60 that is shown in FIG. 6 and that includes the processor 61 and the communications module 62, as shown in FIG. 7, the wearable device 60 in this embodiment of the present disclosure may further include a sensor 63 and a storage 64.

The sensor 63 may include at least one of sensors such as a proximity sensor, a light sensor, or a capacitive sensor. The processor 61 is specifically configured to detect, by using the sensor 63, whether the Bluetooth headset is detached from the wearable device 60.

The storage 64 and the processor 61 are connected and complete communication with each other by using a bus.

The storage 64 is configured to store functional modules in the wearable device 60 and an application program, and the processor 61 runs the application program and the modules that are stored in the storage 64, to execute functional applications of the wearable device 60 and implement data processing. The storage 64 mainly includes a program storage area and a data storage area, where the program storage area may store an operating system and an application program required by at least one function such as a sound playing program and an image display program; and the program storage area may store data (such as audio data) created according to the use of the wearable device 60, and the like. In a specific implementation manner of the present disclosure, the storage 64 may include a nonvolatile memory such as a nonvolatile random access memory (NVRAM), a phase change random access memory (PRAM), or a magetoresistive random access memory (MRAM); and the storage 64 may also include a non-volatile memory such as at least one magnetic disk storage device, an electrically erasable programmable read only memory ( ), or a flash memory device such as a not-or flash memory (NOR flash memory) or a not-and flash memory (NAND flash memory). The nonvolatile memory stores the operating system and the application program that are executed by the processor 61. The processor 61 loads a running program and data from the nonvolatile memory to a memory, and stores data content in a large quantity of storage apparatus. The operating system includes control and management of conventional system tasks such as memory management, storage device control, and power management, and various components and/or drivers that facilitate communication between various types of software and hardware. In an implementation manner of the present disclosure, the operating system may be an Android® system, an iOS system, a Windows® operating system, or the like, or is an embedded operating system such as Vxworks®.

It should be noted that in this embodiment of the present disclosure, the processor 61 may be a control center such as a central processing unit (CPU) of the wearable device 60, and the control center may connect parts of the entire wearable device 60 by using interfaces and lines, run or execute program code and/or modules that are stored in the storage 64, and invoke data stored in the storage 64, to execute functions of the wearable device 60 and/or process data. The processor 61 may include an integrated circuit (IC) or an application-specific integrated circuit (ASIC) (for example, the processor 61 may include a single encapsulated IC, or may include multiple encapsulated ICs with a same function or different functions). For example, the processor 61 may include only the CPU, or may be a combination of the CPU, a graphic processing unit (GPU), a digital signal processor (DSP), and a control chip (such as a baseband chip) in a communication unit. In an implementation manner of the present disclosure, the CPU may be a single computing core or may include multiple computing cores.

The bus may be an industry standard architecture (ISA) bus, a Peripheral Component Interconnect (PCI) bus or an extended industry standard architecture (EISA) bus, or the like. The bus may be classified into an address bus, a data bus, a control bus, and the like. For ease of description, the bus is represented in FIG. 6 and in FIG. 7 by using only one bold line, but it does not represent that there is only one bus or one type of bus.

Further, the processor 61 is further configured to after detecting that the Bluetooth headset is detached from the wearable device, establish a Bluetooth pairing with the Bluetooth headset; acquire identifier information of the Bluetooth headset; and save the identifier information of the Bluetooth headset in the storage 64.

The storage 64 is configured to save the identifier information of the Bluetooth headset that is acquired by the processor 61, where the identifier information of the Bluetooth headset includes address information of the Bluetooth headset.

Further, the first notification sent by the communications module 62 carries the identifier information of the Bluetooth headset, and the first notification sent by the communications module 62 is used to instruct the communications device to transmit, by means of Bluetooth, the voice message to the Bluetooth headset indicated by the identifier information of the Bluetooth headset.

It should be noted that the functional modules in the wearable device 60 in this embodiment of the present disclosure include, but are not limited to, the functional modules described above.

Exemplarily, the wearable device 60 may further include some input modules 65, configured to implement interaction between a user and the wearable device 60.

For example, an input module 65 may receive digital character information input by the user, to generate signal input related to a user setting or function control. In a specific implementation manner of the present disclosure, the input module 65 may be a touch panel, or may be another human-computer interaction interface such as a physical input key or a microphone, or may be another external information capturing apparatus such as a camera. The touch panel, which is also referred to as a touch screen or a touch control screen, can acquire an operation action of the user on or near the touch panel, for example, an operation action of the user on the touch panel or at a position near the touch panel by using any suitable object or accessory such as a finger or a stylus, and drive a corresponding connection apparatus according to a preset program. Optionally, the touch panel may include two parts a touch detection apparatus and a touch controller. The touch detection apparatus detects a touch operation of the user, converts the detected touch operation into an electrical signal, and transfers the electrical signal to the touch controller. The touch controller receives the electrical signal from the touch detection apparatus, converts the electrical signal into touch point coordinates, and then sends the touch point coordinates to the processor 61. The touch controller may further receive a command sent by the processor 61, and execute the command. In addition, the touch panel may be a resistive, capacitive, infrared (Infrared), or surface acoustic wave touch panel. In another implementation manner of the present disclosure, the physical input key used by the input module 65 may include, but is not limited to, one or more of a physical keyboard, a functional key (such as a volume control key or a switch key), a trackball, a mouse, and a joystick. The input module 65 in the form of the microphone may acquire a voice input by the user or from an environment and convert the voice into a command that is in the form of an electrical signal and that can be executed by the processor 61. Exemplarily, the wearable device 60 may further include some output modules 66, configured to implement interaction between the user and the wearable device 60.

The output module 66 includes, but is not limited to, a visual output module and an audio output module. The visual output module is configured to output text, a picture and/or a video. The visual output module may include a display panel, for example, a display panel configured in the form of a liquid crystal display (LCD), an organic light-emitting diode (OLED), a field emission display (FED), or the like. Alternatively, the visual output module may include a reflective display, for example, a display using a light interference modulation technology. The visual output module may include a single display or multiple displays of different sizes. In a specific implementation manner of the present disclosure, the touch panel used by the foregoing input module 65 may also be used as the display panel of the output module 66. For example, after detecting touch on the touch panel or a gesture operation near the touch panel, the touch panel transmits the touch or gesture operation to the processor 61 to determine a type of a touch event, and subsequently, the processor provides corresponding visual output on the display panel according to the type of the touch event. As shown in FIG. 7, the input module 65 and the output module 66 may be used as two independent components to implement input and output functions of the wearable device 60, but in some embodiments, the input module 65 and the output module 66 may be integrated to implement the input and output functions of the wearable device (as shown in FIG. 7, the input module 65 and the output module 66 are included in one dotted line box, to represent that the input module 65 and the output module 66 are integrated). For example, the visual output module 66 may display various graphical user interfaces (GUI) as virtual control components, which include, but are not limited to, a window, a scroll bar, an icon, and a clipboard, for the user to perform an operation by means of touch control.

Moreover, in this embodiment of the present disclosure, the modules such as the processor 61, the communications module 62, the sensor 63, the storage 64, the output module 65, and the output module 66 are connected and complete communication with each other by using the bus.

Exemplarily, the wearable device 60 may further include a power supply 67, configured to supply power to different components of the wearable device 60 to maintain running of the components. Generally, the power supply 67 may be a built-in battery, for example, a common lithium-ion battery or a nickel metal hydride battery, and also includes an external power supply, for example, an AC adapter, that directly supplies power to the wearable device 60. In some implementation manners of the present disclosure, the power supply 66 may also have broader definitions, for example, may also include a power management system, a charging system, a power failure detection circuit, a power converter or inverter, a power status indicator (such as a light emitting diode), and any other component related to generation, management, and distribution of electric energy for the wearable device 60.

It should be noted that the wearable device 60 may further include a wearing apparatus 68 for the user to wear the wearable device 60. For example, a Bluetooth wristband includes a wrist strap.

The wearable device provided in this embodiment of the present disclosure may send a first notification to the communications device after detecting that the Bluetooth headset is detached from the wearable device, to instruct the communications device to transmit a voice message to the Bluetooth headset by means of Bluetooth. By means of data exchange between the Bluetooth headset, the wearable device, and the communications device, transmission of a voice message between the Bluetooth headset and the communications device can be implemented. Moreover, a Bluetooth function of the Bluetooth headset may be set to remain in a disabled state before the Bluetooth headset is detached from the wearable device, and the Bluetooth function is enabled only after the Bluetooth headset is detached from the wearable device (that is, when a user removes the Bluetooth headset from the wearable device, and the Bluetooth headset is possibly to be used), which can avoid a problem that power consumption of the Bluetooth headset is relatively high because the Bluetooth function of the Bluetooth headset is in an enabled state for a long time, and reduce the power consumption of the Bluetooth headset.

Embodiment 7

This embodiment of the present disclosure provides a Bluetooth headset 70, where the Bluetooth headset 70 is a detachable Bluetooth device installed on a wearable device, and a Bluetooth function of the Bluetooth headset 70 is in a disabled state before the Bluetooth headset 70 is detached from the wearable device.

Figure 8:
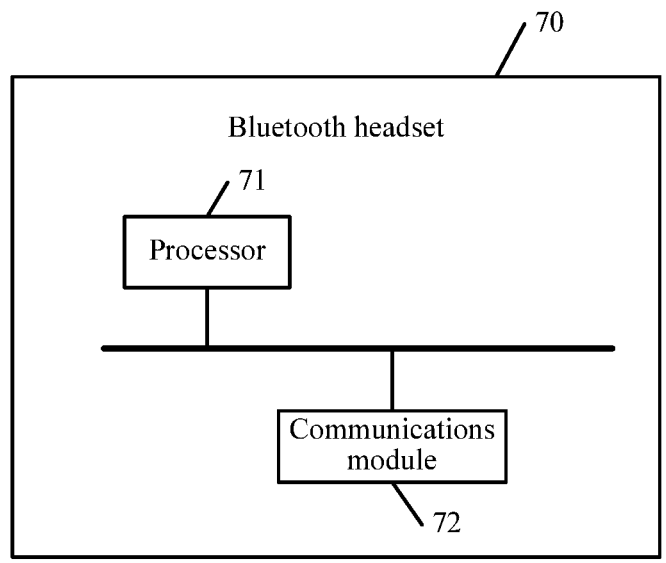
FIG. 8 is a structural diagram of a Bluetooth headset according to Embodiment 7 of the present disclosure.

As shown in FIG. 8, the Bluetooth headset 70 includes a processor 71 and a communications module 72.

The processor 71 is configured to detect whether the Bluetooth headset 70 is detached from the wearable device, and if it is detected that the Bluetooth headset 70 is detached from the wearable device, enable the Bluetooth function.

The communications module 72 is configured to receive a Bluetooth pairing request from a communications device.

The processor 71 is further configured to establish a Bluetooth pairing with the communications device according to the Bluetooth pairing request received by the communications module.

The communications module 72 is further configured to after the processor 71 establishes the Bluetooth pairing with the communications device, transmit a voice message to the communications device by means of Bluetooth.

Further, the Bluetooth pairing request received by the communications module 72 is sent by the communications device according to identifier information of the Bluetooth headset 70.

The processor 71 is further configured to before the communications module 72 receives the Bluetooth pairing request from the communications device, establish a Bluetooth pairing with the wearable device.

The communications module 72 is further configured to send the identifier information of the Bluetooth headset 70 to the wearable device by means of Bluetooth, where the identifier information of the Bluetooth headset 70 includes address information of the Bluetooth headset 70, and the identifier information of the Bluetooth headset 70 is acquired by the processor 71 by establishing the Bluetooth pairing with the wearable device.

Further, the Bluetooth pairing request received by the communications module 72 is sent by the communications device according to identifier information of the Bluetooth headset 70.

The identifier information of the Bluetooth headset 70 is prestored in the wearable device.

The identifier information of the Bluetooth headset 70 includes address information of the Bluetooth headset 70.

Further, the processor 71 is further configured to before the voice message is transmitted to the communications device by means of Bluetooth, detect whether the Bluetooth headset 70 is in an attachedstate.

The communications module 72 is further configured to if the processor 71 detects that the Bluetooth headset 70 is in the attachedstate, transmit the voice message to the communications device by means of Bluetooth.

Figure 9:
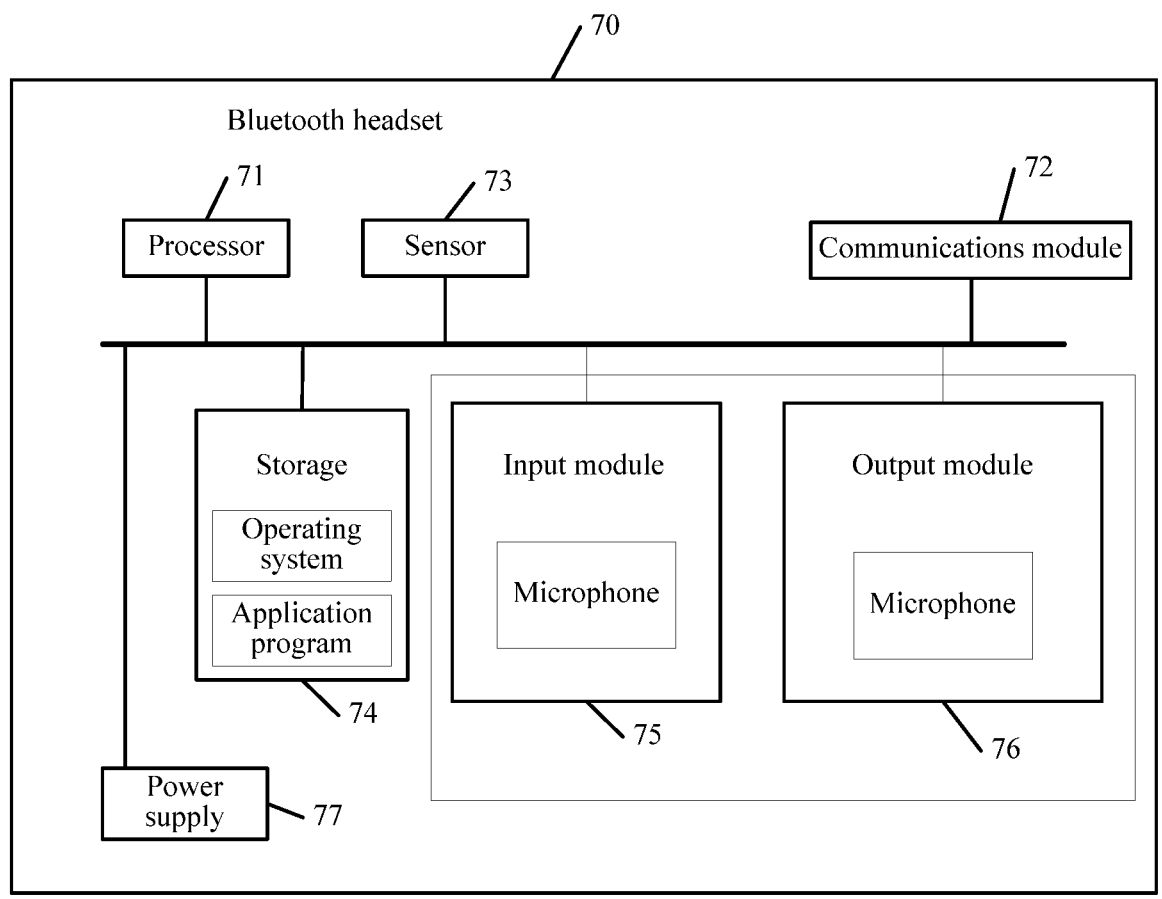
FIG. 9 is a structural diagram of another Bluetooth headset according to Embodiment 7 of the present disclosure.

Further, based on the Bluetooth headset 70 that is shown in FIG. 8 and that includes the processor 71 and the communications module 72, as shown in FIG. 9, the Bluetooth headset 70 in this embodiment of the present disclosure may further include a sensor 73 and a storage 74.

The sensor 73 may include at least one of sensors such as a proximity sensor, a light sensor, or a capacitive sensor.

The processor 71 is specifically configured to detect, by using the sensor 73, whether the Bluetooth headset 70 is detached from the wearable device.

In this embodiment of the present disclosure, the communications module 72 may be a Bluetooth module configured to exchange data with an external device; or the communications module 72 may be a communication interface configured to exchange data with an external device. For the Bluetooth module and the communication interface, reference may be made to related descriptions in other embodiments of the present disclosure, and details are not described herein again in this embodiment.

Further, as shown in FIG. 9, the Bluetooth headset 70 may further include a storage 74, configured to store functional modules that are in the Bluetooth headset 70 and a software program, and the processor 71 runs the software program and the modules that are stored in the storage 74, to execute functional applications of the Bluetooth headset 70 and implement data processing. For the storage 74, reference may be made to related descriptions of the storage 64 in Embodiment 6 of the present disclosure, and for the processor 71, reference may be made to related descriptions of the processor 61 in Embodiment 6 of the present disclosure, which are not described herein again in detail in this embodiment.

Further, as shown in FIG. 9, the Bluetooth headset 70 may further include an output module 74 and an input module 75.

The input module 75 may be a microphone of the Bluetooth headset 70, and the output module 76 may be an audio output module, for example, a microphone, of the Bluetooth headset 70. Certainly, the input module 75 and the output module 76 are not limited to the microphone. For other specific content of the input module 75 and the output module 76, reference may be made to related descriptions in Embodiment 6 of the present disclosure, and details are not described herein again in this embodiment. The input module 75 and the output module 76 may be integrated to implement input and output functions of the wearable device. As shown in FIG. 9, the input module 75 and the output module 76 are included in one dotted line box, to represent that the input module 75 and the output module 76 are integrated.

Moreover, in this embodiment of the present disclosure, the modules such as the processor 71, the communications module 72, the sensor 73, the storage 74, the output module 75, and the output module 76 are connected and complete communication with each other by using a bus. The bus is represented in FIG. 8 and FIG. 9 by using only one bold line, but it does represent that there is only one bus or one type of bus.

Further, the Bluetooth headset 70 may further include a battery 77 and a wearing apparatus for a user to wear the Bluetooth headset 70.

According to the Bluetooth headset 70 provided in this embodiment of the present disclosure, a Bluetooth function of the Bluetooth headset may be set to remain in a disabled state before the Bluetooth headset is detached from the wearable device, and the Bluetooth headset enables the Bluetooth function only after the Bluetooth headset is detached from the wearable device (that is, when a user removes the Bluetooth headset from the wearable device, and the Bluetooth headset is possibly to be used), which can avoid a problem that power consumption of the Bluetooth headset is relatively high because the Bluetooth function of the Bluetooth headset is in an enabled state for a long time, and reduce the power consumption of the Bluetooth headset.

Embodiment 8

This embodiment of the present disclosure provides a communications device 80, where a Bluetooth headset is a detachable Bluetooth device installed on a wearable device, a Bluetooth function of the Bluetooth headset is in a disabled state before the Bluetooth headset is detached from the wearable device, and if the Bluetooth headset detects that the Bluetooth headset is detached from the wearable device, the Bluetooth headset enables the Bluetooth function.

Figure 10:
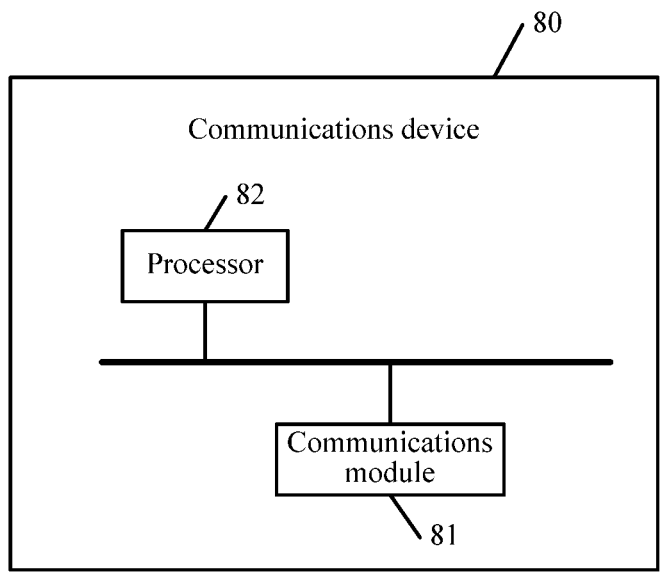
FIG. 10 is a structural diagram of a communications device according to Embodiment 8 of the present disclosure.

As shown in FIG. 10, the communications device 80 includes a communications module 81 and a processor 82.

The communications module 81 is configured to receive a first notification from the wearable device, where the first notification is used to instruct the communications device to establish a Bluetooth pairing with the Bluetooth headset.

The processor 82 is configured to control the communications module to send a Bluetooth pairing request to the Bluetooth headset according to identifier information of the Bluetooth headset, where the Bluetooth pairing request is used to request to establish a Bluetooth pairing with the communications device, and the identifier information of the Bluetooth headset is carried in the first notification received by the communications module, or the identifier information of the Bluetooth headset is prestored in the communications device 80; and control the communications module 81 to transmit a voice message to the Bluetooth headset by means of Bluetooth.

Figure 11:
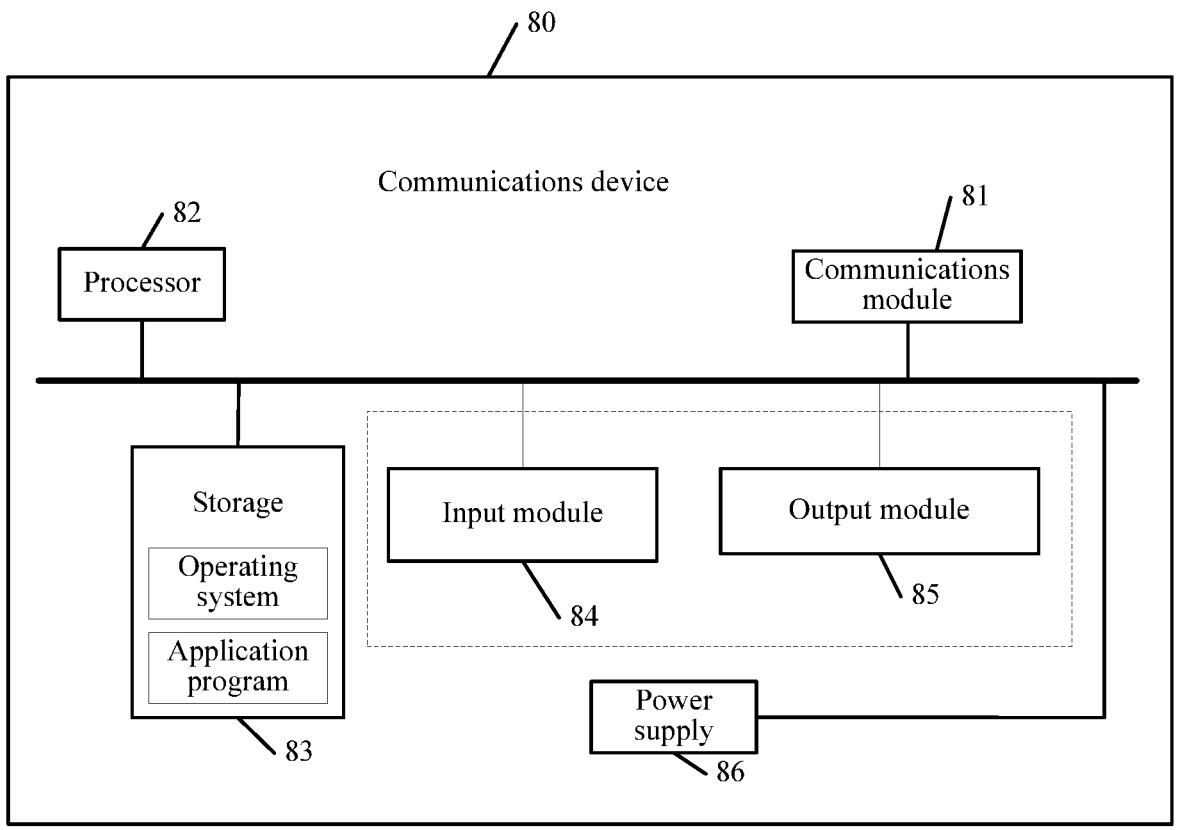
FIG. 11 is a structural diagram of another communications device according to Embodiment 8 of the present disclosure.

Further, based on the communications device 80 that is shown in FIG. 10 and that includes the processor 82 and the communications module 81, as shown in FIG. 11, the communications device 80 may further include modules such as a storage 83, an input module 84, an output module 85, and a power supply 86. Moreover, in this embodiment of the present disclosure, the modules such as the processor 82, the communications module 81, the storage 83, the output module 84, and the output module 85 are connected and complete communication with each other by using a bus.

For specific descriptions of the modules such as the processor 82, the communications module 81, the storage 83, the output module 84, and the output module 85, and the bus connecting the foregoing modules, reference may be made to related content in Embodiment 6 of the present disclosure, and details are not described herein again in this embodiment. The bus is represented in FIG. 10 and FIG. 11 by using only one bold line, but it does represent that there is only one bus or one type of bus.

The communications device 80 provided in this embodiment of the present disclosure may transmit a voice message to the Bluetooth headset by means of Bluetooth after receiving a first notification sent by the communication device. By means of data exchange between the Bluetooth headset, the wearable device, and the communications device, transmission of a voice message between the Bluetooth headset and the communications device can be implemented. Moreover, a Bluetooth function of the Bluetooth headset may be set to remain in a disabled state before the Bluetooth headset is detached from the wearable device, and the Bluetooth function is enabled only after the Bluetooth headset is detached from the wearable device (that is, when a user removes the Bluetooth headset from the wearable device, and the Bluetooth headset is possibly to be used), which can avoid a problem that power consumption of the Bluetooth headset is relatively high because the Bluetooth function of the Bluetooth headset is in an enabled state for a long time, and reduce the power consumption of the Bluetooth headset.

The foregoing descriptions about implementation manners allow a person skilled in the art to understand that for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or part of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processor 61, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present disclosure. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for a wearable device to communicate with a detachable Bluetooth headset, the method comprising:
   detecting that the detachable Bluetooth headset is detached from the wearable device and has transitioned to an enabled Bluetooth state; and
   in response to the detachable Bluetooth headset detaching from the wearable device and transitioning to the enable Bluetooth state:

establishing a Bluetooth pairing between the wearable device and the detachable Bluetooth headset; and
sending, via the wearable device, a notification to a communications device instructing the communications device to transmit a voice message to the detachable Bluetooth headset using Bluetooth.

2. The method of claim 1, further comprising:
acquiring identifier information of the detachable Bluetooth headset, wherein the identifier information of the detachable Bluetooth headset includes address information of the detachable Bluetooth headset; and
saving the identifier information of the detachable Bluetooth headset.

3. The method of claim 2, wherein the notification includes the identifier information of the detachable Bluetooth headset.

4. A method implemented by a detachable Bluetooth headset detachably installed on a wearable device, the method comprising:
enabling a Bluetooth function in response to the detachable Bluetooth headset detecting that the detachable Bluetooth headset has detached from the wearable device and has transitioned to an enabled Bluetooth state;
establishing, in response to the detachable Bluetooth headset detaching from the wearable device and transitioning to the enable Bluetooth state, a Bluetooth pairing with the wearable device;
sending identifier information of the detachable Bluetooth headset to the wearable device using Bluetooth, wherein the identifier information includes address information of the detachable Bluetooth headset;
receiving, via the detachable Bluetooth headset, a Bluetooth pairing request from a communications device distinct from the wearable device;
establishing a Bluetooth pairing with the communications device according to the Bluetooth pairing request; and
transmitting, via the detachable Bluetooth headset, a message listening command to the communications device using Bluetooth.

5. The method of claim 1, further comprising receiving an incoming call message from the communications device, and wherein detecting that the detachable Bluetooth headset has detached from the wearable device and has transitioned to an enabled Bluetooth state is performed after receiving the incoming call message.

6. The method of claim 4, further comprising detecting when the detachable Bluetooth headset is in a paired state before transmitting the message listening command to the communications device.

7. A method implemented by a communications device, the method comprising:
receiving a notification from a wearable device in response to a detachable Bluetooth headset detaching from the wearable device and transitioning to an enabled Bluetooth state, wherein the notification instructs the communications device to establish a Bluetooth pairing with the detachable Bluetooth headset;
sending, in response to receiving the notification, a Bluetooth pairing request to the detachable Bluetooth headset based on identifier information of the detachable Bluetooth headset to establish the Bluetooth pairing with the communications device and the detachable Bluetooth headset; and
transmitting, via the communications device, a voice message to the detachable Bluetooth headset using the Bluetooth pairing.

8. A wearable device comprising:
a detachable Bluetooth headset detachably coupled to the wearable device;
a memory storing instructions; and
a processor coupled to the memory, wherein the instructions, when executed, cause the processor to:
detect that the detachable Bluetooth headset has detached from the wearable device and has transitioned to an enabled Bluetooth state;
establish, in response to the detachable Bluetooth headset detaching from the wearable device and transitioning to the enable Bluetooth state, a Bluetooth pairing between the wearable device and the detachable Bluetooth headset;
send identifier information of the Bluetooth headset to the wearable device using Bluetooth, wherein the identifier information includes address information of the Bluetooth headset; and
send a notification to a communications device to instruct the communications device to transmit a voice message to the detachable Bluetooth headset using Bluetooth in response to the detachable Bluetooth headset detaching from the wearable device and transitioning to an enabled Bluetooth state.

9. The wearable device of claim 8, wherein the instructions, when executed, cause the processor to:
acquire identifier information of the detachable Bluetooth headset; and
save the identifier information of the detachable Bluetooth headset in the memory,
wherein the identifier information of the detachable Bluetooth headset includes address information of the detachable Bluetooth headset.

10. The wearable device of claim 9, wherein the notification from the communications device includes the identifier information of the detachable Bluetooth headset.

11. A Bluetooth headset comprising:
a transceiver; and
a processor coupled to the transceiver and configured to:
detect whether the Bluetooth headset detaches from a wearable device;
enable a Bluetooth function when the Bluetooth headset detaches from the wearable device and the Bluetooth headset transitions to an enabled Bluetooth state;
establish, in response to the detachable Bluetooth headset detaching from the wearable device and transitioning to the enable Bluetooth state, a Bluetooth pairing with the wearable device;
send identifier information of the Bluetooth headset to the wearable device using Bluetooth, wherein the identifier information includes address information of the Bluetooth headset;
receive, via the transceiver, a Bluetooth pairing request from a communications device, wherein the Bluetooth pairing request includes a Bluetooth device address;
establish, via the transceiver, a Bluetooth pairing with the communications device based on the Bluetooth pairing request received by the transceiver; and
transmit a voice message to the communications device using Bluetooth after the processor establishes the Bluetooth pairing with the communications device.

12. The Bluetooth headset of claim 11, wherein the Bluetooth pairing request includes identifier information of the Bluetooth headset.

13. A communications device comprising:
- a transceiver configured to:
  - receive, in response to a detachable Bluetooth headset detaching from a wearable device and transitioning to an enabled Bluetooth state, a notification from the wearable device, wherein the notification includes an instruction to establish a Bluetooth pairing with the detachable Bluetooth headset;
  - transmit a voice message to the detachable Bluetooth headset using Bluetooth; and
  - transmit a Bluetooth pairing request to the detachable Bluetooth headset; and
- a processor coupled with the transceiver and configured to:
  - cause the transceiver to transmit, according to identifier information of the detachable Bluetooth headset, the Bluetooth pairing request to the detachable Bluetooth headset; and
  - cause the transceiver to transmit a voice message to the detachable Bluetooth headset using Bluetooth.

14. The method of claim 1, further comprising acquiring identifier information of the detachable Bluetooth headset, wherein the identifier information includes address information of the detachable Bluetooth headset, and wherein the notification carries the identifier information of the detachable Bluetooth headset.

15. The method of claim 7, wherein the notification includes the identifier information of the detachable Bluetooth headset.

16. The method of claim 7, wherein the identifier information of the detachable Bluetooth headset is prestored in the communications device.

17. The communications device of claim 13, wherein the notification from the wearable device comprises the identification information of the detachable Bluetooth headset.

18. The communications device of claim 13, wherein the identifier information of the detachable Bluetooth headset is prestored in the communications device.

* * * * *